US012145535B2

(12) United States Patent
Ueno et al.

(10) Patent No.: US 12,145,535 B2
(45) Date of Patent: Nov. 19, 2024

(54) VEHICULAR APPARATUS

(71) Applicant: DENSO CORPORATION, Kariya (JP)

(72) Inventors: Kouji Ueno, Kariya (JP); Shunsuke Yokoyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 112 days.

(21) Appl. No.: 17/644,325

(22) Filed: Dec. 14, 2021

(65) Prior Publication Data

US 2022/0105899 A1 Apr. 7, 2022

Related U.S. Application Data

(63) Continuation of application No. PCT/JP2020/024595, filed on Jun. 23, 2020.

(30) Foreign Application Priority Data

Jun. 28, 2019 (JP) ................. 2019-121477

(51) Int. Cl.
| | | |
|---|---|---|
| B60R 25/30 | (2013.01) | |
| B60R 1/22 | (2022.01) | |
| B60R 1/26 | (2022.01) | |
| H04N 7/18 | (2006.01) | |
| H04N 23/65 | (2023.01) | |
| H04N 23/66 | (2023.01) | |

(52) U.S. Cl.
CPC ............ B60R 25/305 (2013.01); B60R 1/22 (2022.01); B60R 1/26 (2022.01); H04N 7/18 (2013.01); H04N 23/65 (2023.01); H04N 23/66 (2023.01)

(58) Field of Classification Search
CPC .......... H04N 23/65; H04N 23/66; H04N 7/18; B60R 2300/40; B60R 25/305; B60R 1/22
See application file for complete search history.

(56) References Cited

U.S. PATENT DOCUMENTS

| | | | |
|---|---|---|---|
| 10,339,811 B2* | 7/2019 | Ohno | G08G 1/166 |
| 10,375,345 B2* | 8/2019 | Noguchi | B60R 1/00 |
| 11,548,444 B2* | 1/2023 | Lynam | H04N 23/63 |
| 2012/0162427 A1* | 6/2012 | Lynam | B60R 11/04 |
| | | | 348/148 |
| 2012/0217764 A1* | 8/2012 | Ishiguro | B60R 1/00 |
| | | | 296/1.07 |
| 2015/0228246 A1 | 8/2015 | Kim et al. | |
| 2018/0091761 A1* | 3/2018 | Noguchi | H04N 23/63 |

FOREIGN PATENT DOCUMENTS

| | | | |
|---|---|---|---|
| JP | 2006027307 A | 2/2006 | |
| JP | 2009284023 A | 12/2009 | |
| JP | 2012201175 A | 10/2012 | |
| JP | 2015154482 A | 8/2015 | |
| JP | 2016064010 A | 4/2016 | |
| JP | 2016164010 A | 9/2016 | |

* cited by examiner

*Primary Examiner* — Boubacar Abdou Tchoussou
(74) *Attorney, Agent, or Firm* — Harness, Dickey & Pierce, P.L.C.

(57) ABSTRACT

A vehicular apparatus includes a controller unit configured to control a displaying operation of a video by a camera on a display and a communicator unit as an acquisition unit configured to acquire a vehicle state signal indicating a vehicle state. The controller unit is configured to perform a preparation for displaying the video by the camera on the display in response to the communicator unit acquiring the vehicle state signal indicating the vehicle state where the video by the camera is required.

5 Claims, 5 Drawing Sheets

VEHICULAR APPARATUS

CROSS REFERENCE TO RELATED APPLICATIONS

The present application is a continuation application of International Patent Application No. PCT/JP2020/024595 filed on Jun. 23, 2020, which designated the U.S. and claims the benefit of priority from Japanese Patent Application No. 2019-121477 filed on Jun. 28, 2019. The entire disclosures of all of the above applications are incorporated herein by reference.

TECHNICAL FIELD

The present disclosure relates to a vehicular apparatus.

BACKGROUND

There is a vehicular apparatus which displays a video captured by an in-vehicle camera on a display in the vehicle. It takes time for a controller of the vehicular apparatus to be activated. Therefore, it has been proposed that the controller of the vehicular apparatus is bypassed at the time of activation, and another controller on the display side performs a process of displaying a video.

SUMMARY

According to an example of the present disclosure, a vehicular apparatus is provided to include a controller unit configured to control a displaying operation of a video by a camera on a display and a communicator unit as an acquisition unit configured to acquire a vehicle state signal indicating a vehicle state. The controller unit is configured to perform a preparation for displaying the video by the camera on the display in response to the communicator unit acquiring the vehicle state signal indicating the vehicle state where the video by the camera is required.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

Hereinafter, a plurality of embodiments will be described with reference to the drawings. In each embodiment, substantially common parts will be described with the same reference numerals.

First Embodiment

Figure 1:
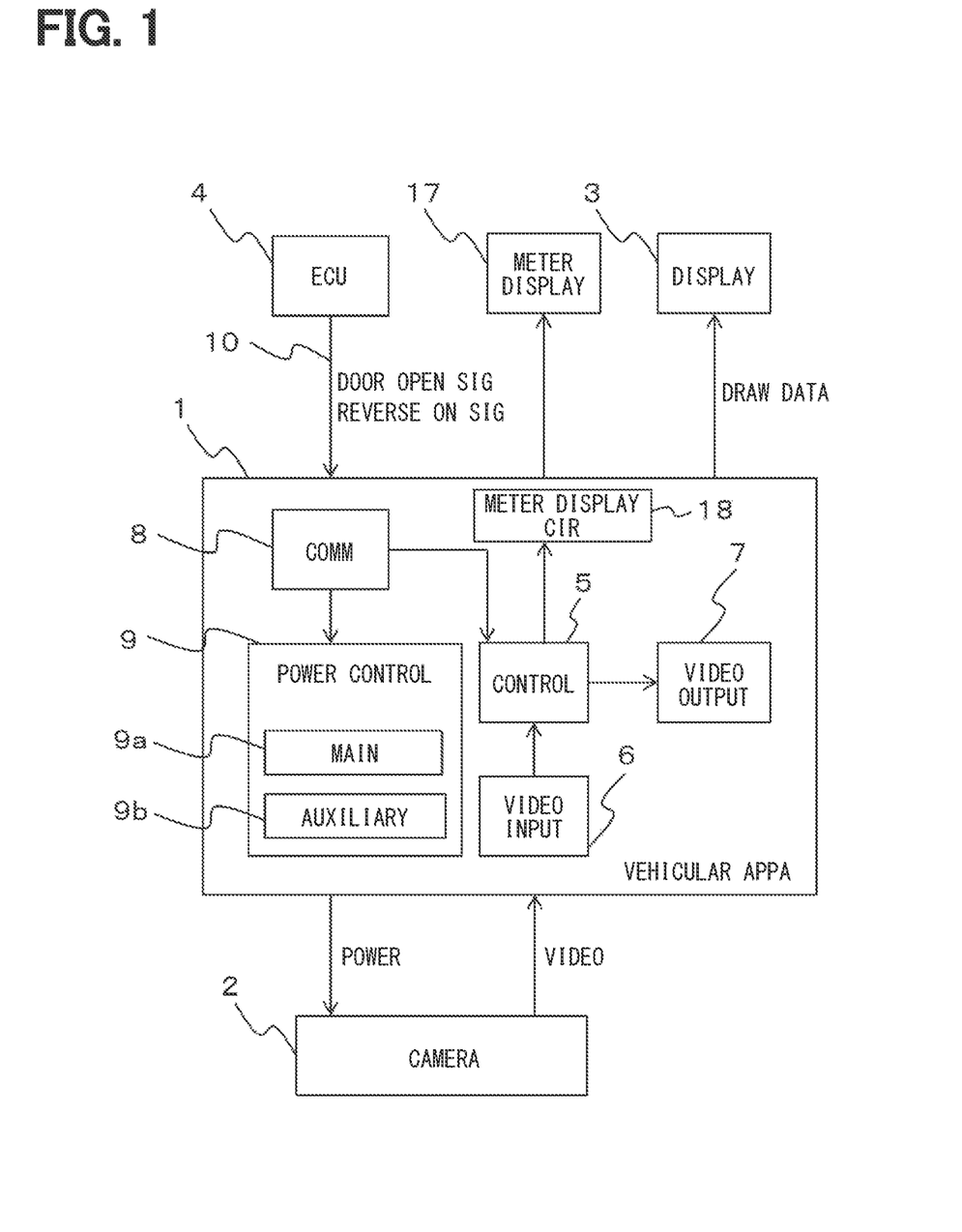
FIG. 1 is a diagram schematically showing an electrical configuration of a vehicular apparatus according to a first embodiment.

Hereinafter, a first embodiment will be described. As shown in FIG. 1, a vehicular apparatus 1 mounted on a vehicle is connected to a camera 2, a display 3, an electronic control unit 4 (hereinafter, ECU 4), and the like. Note that FIG. 1 illustrates a configuration in which one camera 2, one display 3, and one ECU 4 are connected to the vehicular apparatus 1. However, the vehicular apparatus 1 may be configured to be connected to a plurality of cameras 2, a plurality of displays 3, or a plurality of ECUs 4.

Figure 2:
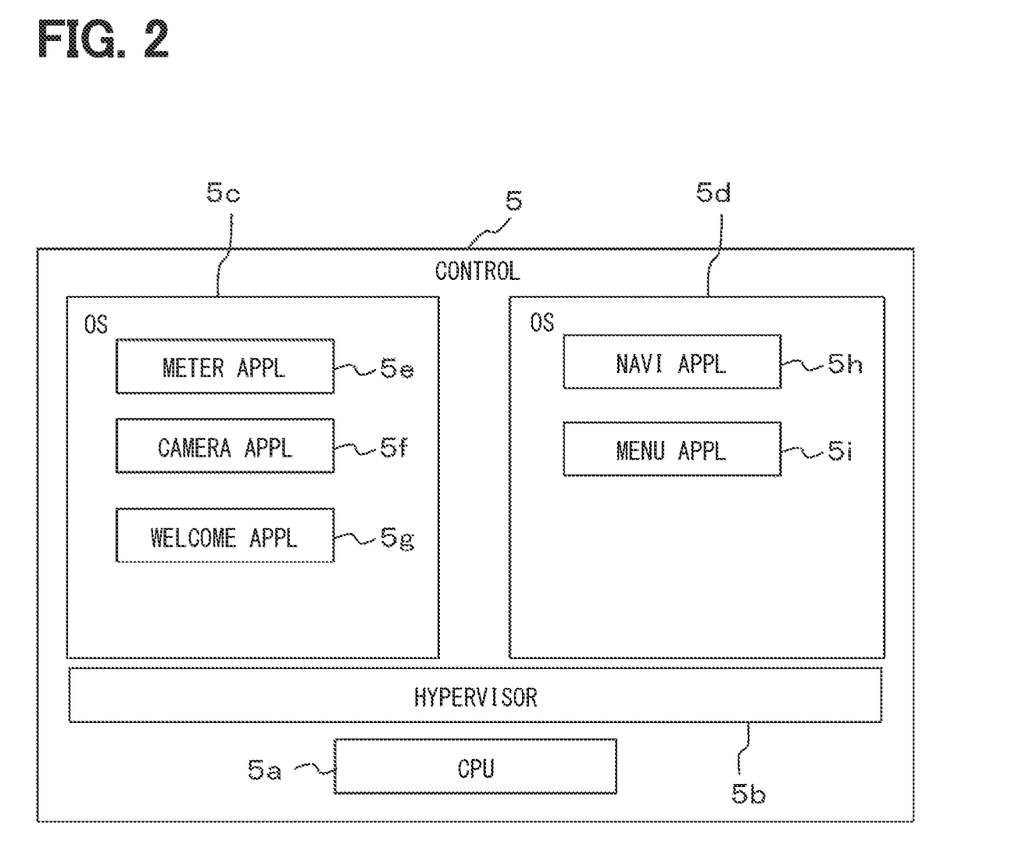
FIG. 2 is a diagram schematically showing a software configuration of a controller unit according to the first embodiment.

The vehicular apparatus 1 includes a controller unit 5, a video input unit 6, a video output unit 7, a communicator unit 8, and a power supply controller unit 9. The controller unit 5 includes a so-called microcomputer, and controls the entire vehicular apparatus 1 by executing a computer program stored in a storage or a storage medium (not shown). Specifically, in the controller unit 5, as shown in FIG. 2, a hypervisor 5b is operating on the CPU 5a, and for example, two operating systems of an operating system 5c and an operating system 5d are operating on the hypervisor 5b. Hereinafter, the operating system will be referred to as an OS. The number of operating OSs is an example, and it is possible to configure a configuration in which three or more OSs operate. Further, for example, when the OS 5c has a hypervisor function, the OS 5c may be operated on the CPU 5a, and the OS 5d may be operated on the hypervisor function provided in the OS 5c.

The OS 5c is a so-called real-time OS, and performs processing that requires real-time performance as compared with the OS 5d. The OS 5c mainly processes information related to the vehicle, such as information related to the running or safety of the vehicle. Real-time OSs are generally designed to be relatively more stable than general-purpose OSs, such as being less prone to problems during their own operation and being able to predict or limit the execution time of application programs.

Hereinafter, the application program will be referred to as an application for convenience.

On this OS 5c, for example, a meter application 5e, a camera application 5f, a welcome application 5g, or the like is executed. The meter application 5e is a program that displays on the meter display 17, and displays an image such as a speedometer, a tachometer, or a warning light on the meter display 17. This meter application 5e displays information on the running and safety of the vehicle and information stipulated by laws and regulations such as whether or not a seatbelt is worn; prompt display and appropriate display update are required. Therefore, the meter application 5e is implemented on OS 5c, which is a real-time OS. The information displayed by the meter application 5e is transmitted to the meter display 17 including a TFT panel, as drawing data in LVDS format, via the meter display circuit 18.

The camera application 5f performs a process of displaying the video from the camera 2 on the display 3. The camera application 5f processes the video captured by the camera 2 input to the video input unit 6 configured by the AD converter or the like. The camera application 5f performs a control to output the processed video, for example, as LVDS format drawing data, from the video output unit 7 configured by the LVDS driver or the like, to the TFT panel display. As will be described later, this camera application 5f is implemented on the OS 5c in order to quickly display the video captured by the camera 2 in a situation where the vehicle may move.

The welcome application 5g is a program for displaying a so-called welcome message on the display 3 and the meter display 17. This welcome application 5g is implemented on the OS 5c because it is necessary to quickly display the image when the vehicular apparatus 1 is activated. Further, the welcome application 5g is executed in parallel with the camera application 5f, and for example, a welcome message is displayed before the video captured by the camera 2 is displayed.

On the other hand, the OS 5d is a so-called general-purpose OS: although its real-time performance is relatively low as compared with the OS 5c, it has an advantage that general-purpose processing such as a so-called multimedia function can be easily executed. In this way, the vehicular apparatus 1 operates a plurality of OSs 5c, 5d so that the processing can be shared according to the required functions.

For example, a navigation application 5h or a menu application 5i is executed on the OS 5d. The navigation application 5h is a program that provides a so-called navigation function, and generates and displays a map image, a route guidance image, and the like to be displayed on the display 3. At this time, the navigation application 5h is implemented on the OS 5d because it performs multimedia image processing. The menu application 5i generates and displays a menu screen or the like to be displayed on the display 3, and performs processing for accepting user operations. Since MM (Multi-Media) type processing such as image processing is performed on this menu screen, the menu application 5i is implemented on the OS 5d. Note that the controller unit 5 may also be referred to as a controller 5. Further, as described above, the controller unit 5 controls a displaying operation so that the controller unit 5 may also be referred to as a display controller unit 5 or a display controller 5. The "controller" will be described in detail to be later.

The communicator unit 8 is always in the activated state and monitors the vehicle state signal output from the ECU 4. When the communicator unit 8 receives the vehicle state signal to be dealt with or responded to, the communicator unit 8 activates the power supply controller unit 9. In the present embodiment, the vehicle state signal to be dealt with includes a vehicle state signal for activating the controller unit 5, and other vehicle state signals, which will be described in detail to be later. Such other vehicle state signals include a vehicle state signal indicating the state where the video captured by the camera 2 is required, and a vehicle state signal indicating the state where the video captured by the camera 2 may be used.

The vehicle state signal for activating the controller unit 5 includes an accessory ON signal indicating that the accessory switch is turned on in the present embodiment. The vehicle state signal indicating the state where the video captured by the camera 2 is required, and the vehicle state signal indicating the state where the video captured by the camera 2 may be used will be described to be later. The communicator unit 8 corresponds to an acquisition unit that acquires a vehicle state signal indicating the state of the vehicle (i.e., a vehicle state). Further, the communicator unit 8 may also be referred to as a communicator 8 or a transceiver 8. Yet further, the communicator unit 8 may be realized as a controller, which may be referred to as a communication controller 8. The "controller" will be described in detail to be later.

The power supply controller unit 9 includes a main power supply circuit 9a and an auxiliary power supply circuit 9b. Further, the power supply controller unit 9 may also be referred to as a power supply controller 9. The "controller" will be described in detail to be later. The main power supply circuit 9a supplies power to a device provided inside the vehicular apparatus 1, such as the controller unit 5. The auxiliary power supply circuit 9b supplies power to a device that is not supplied with power from the main power supply circuit 9a. The auxiliary power supply circuit 9b can also supply power to an external device of the vehicular apparatus 1, and can supply power to, for example, the camera 2 independently of the main power supply circuit 9a. The power supply controller unit 9 controls, for example, a state in which only the auxiliary power supply circuit 9b is operated or a state in which both the main power supply circuit 9a and the auxiliary power supply circuit 9b are operated according to the state of the vehicle.

In the present embodiment, the camera 2 is assumed to be used for rearward monitoring or rearward confirmation to capture an image or video of the rear of the vehicle. In the present embodiment, the camera 2 is configured to output a video in NTSC format when the power supply is started and the internal initialization is completed. In other words, the camera 2 takes a certain amount of time from the start of power supply to the output of video. It should be noted that the cameras 2 for capturing an image or video of the front and side of the vehicle may be separately provided.

The ECU 4 outputs a vehicle state signal indicating the vehicle state to the vehicular apparatus 1 via the Controller Area Network (hereinafter, CAN) bus 10. The ECU 4 outputs, for example, a vehicle state signal indicating that the door is opened, a vehicle state signal indicating that the door is unlocked, a vehicle state signal indicating the position of the shift lever, or the like. The ECU 4 can also output other vehicle state signals required for the vehicle.

Next, the operation of the above configuration will be described.

Since the video captured by the camera 2 can be used, for example, for checking the rear when the vehicle is moved rearward, it is desirable to display the video quickly. Further, for example, in the United States of America, a rule commonly known as the KT (Kids and Transportation) Safety Act has been established, which stipulates the time from when the viewing angle or shift position of the camera 2 is reversed to when the video is displayed.

In this case, it is essential to quickly display the video captured by the camera 2. Specifically, the KT Safety Act stipulates that the time from setting the shift position to the reverse to displaying the video for checking backward is within 2 seconds. In addition to the rearward confirmation, the side and front videos can compensate for the blind spot of the user, and are considered to be useful when moving the vehicle.

On the other hand, the controller unit 5 of the vehicular apparatus 1 controls the entire vehicular apparatus 1 as described above, and it is necessary to activate a large number of tasks at the time of activation. Therefore, it is expected that it will take some time for the controller unit 5 in the vehicular apparatus 1 to complete the activation. In that case, it is conceivable that another device is used to substitute the processing until the controller unit 5 is activated.

However, if other devices are provided to perform processing that is basically required only at activation, the cost will increase. Further, for example, if the microcomputer on the display 3 side controls the displaying operation, it is necessary to have a processing capacity higher than that required for the normal displaying operation, which also causes an increase in cost. Further, it is necessary to transfer the control of the displaying operation after the controller unit 5 of the vehicular apparatus 1 is activated, but it is presumed that the control for smoothly switching the displaying operation becomes complicated. At the same time, there is a risk of causing problems such as delay in other processing due to the processing load.

Further, it is considered that the safety can be further enhanced if the video captured by the camera 2 can be not only displayed but also the obstacles and the like existing in the video can be notified. In that case, for example, in order to detect and notify an obstacle, processing by the controller unit 5 of the vehicular apparatus 1 is required. However, if the controller unit 5 is made faster so that the activation can be completed in a short time, there is a problem that excessive performance occurs except at the time of activation. That is, if the controller unit 5 is easily improved in performance, not only the cost may be increased, but also the processing capacity may be wasted in the normal state.

Therefore, in the vehicular apparatus 1, in a configuration in which the controller unit 5 controls the displaying operation of the video captured by the camera 2 as follows, the video captured by the camera 2 can be quickly displayed at the time of activation.

First, the communicator unit 8 of the vehicular apparatus 1 is constantly supplied with power as described above, and monitors the vehicle state signal on the CAN bus 10. Then, when the communicator unit 8 acquires the vehicle state signal indicating the state where the video captured by the camera 2 may be used, the communicator unit 8 notifies the power supply controller unit 9.

In the present embodiment, a door open signal indicating that the door of the vehicle is opened is set as a vehicle state signal indicating the state where the video captured by the camera 2 may be used. This is because it is assumed that if the door is opened, the user will drive to move the vehicle, and the vehicle may be moved in the back. Therefore, it can be determined that the camera 2 may be used.

Figure 3:
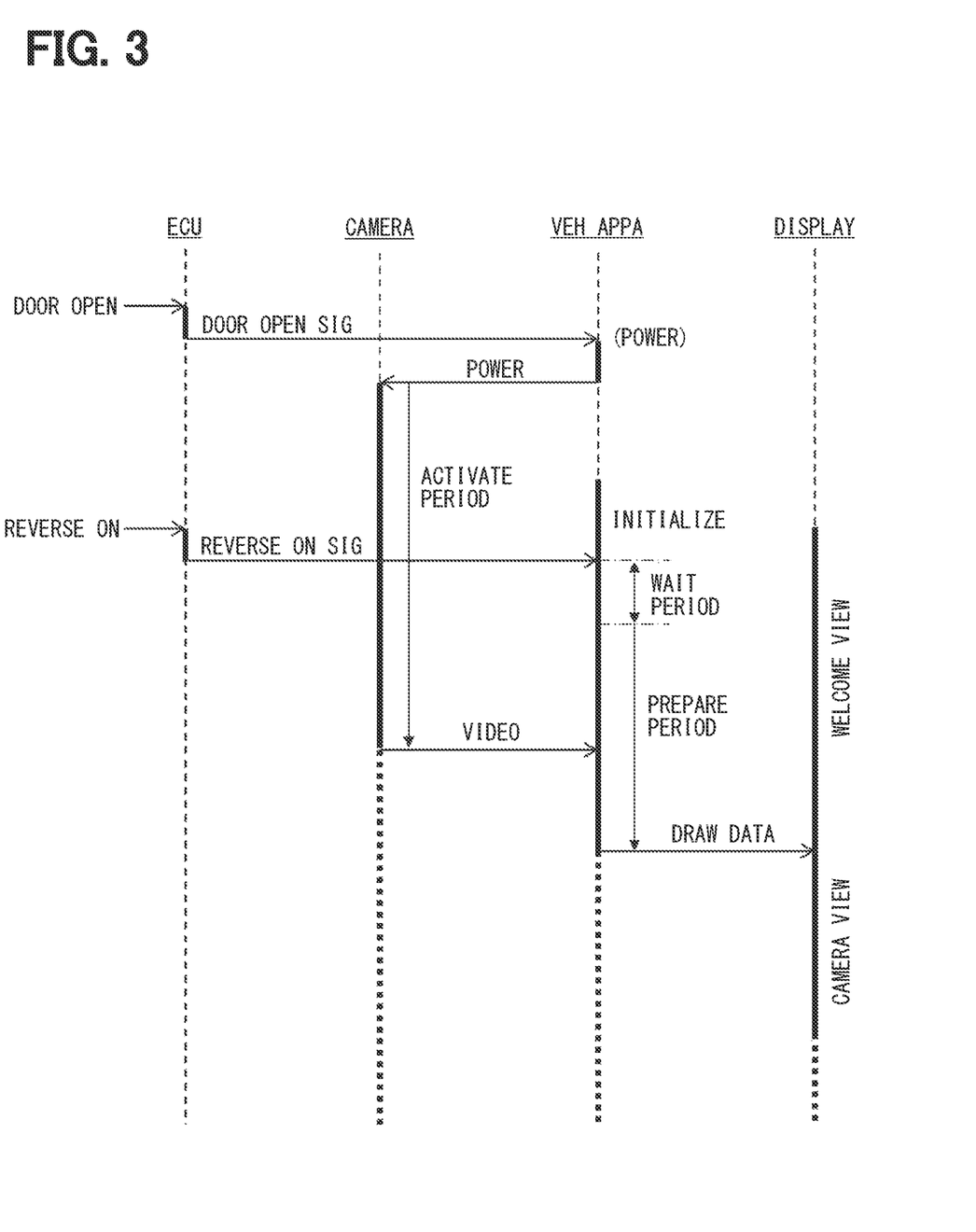
FIG. 3 is a diagram illustrating a displaying sequence by the vehicular apparatus according to the first embodiment.

Specifically, the power supply to each of the vehicular apparatus 1 and the camera 2 is turned off before the vehicle is started. Then, as shown in FIG. 3, when the user performs an operation of opening a door, the ECU 4 detects the opening of the door and outputs a door opening signal to the CAN bus 10. Then, when the communicator unit 8 of the vehicular apparatus 1 acquires the door open signal, it notifies the power supply controller unit 9 that the door open signal is acquired.

Then, the power supply controller unit 9 that has received the notification determines that the video captured by the camera 2 may be used, and starts the power supply to the vehicular apparatus 1. As a result, the power supply from the main power supply circuit 9a to the controller unit 5 is started, and the controller unit 5 starts the initialization process. In this initialization process, the hypervisor 5b is activated, the OS 5c is activated, the peripheral devices such as the video input unit 6 and the video output unit 7 are initialized, the camera application 5f is activated, and a welcome message, which is shown as a welcome view in FIG. 3, is displayed on the meter display 17.

When the power supply to the vehicular apparatus 1 is started, the power supply to the camera 2 is also started from the auxiliary power supply circuit 9b. At this time, the power supply controller unit 9 starts the power supply to the camera 2 without waiting for the completion of the activation of the controller unit 5, regardless of the operating state of the controller unit 5. Then, when the power supply is started, the camera 2 outputs a video after the internal initialization is completed. Although the activation period required from the start of the power supply to the output of a video depends on the specifications of the camera 2, it is assumed that it takes, for example, about 500 milliseconds in the present embodiment.

Therefore, when the vehicular apparatus 1 is in the state where the video captured by the camera 2 may be used, the vehicular apparatus 1 first starts the power supply to the camera 2 regardless of the operation of the controller unit 5. As a result, the time point at which the video is output can be accelerated as compared with the case where the power supply to the camera 2 is started after the controller unit 5 is activated.

In other words, when the operation of the user who is expected to use the camera 2 is confirmed, the vehicular apparatus 1 activates the camera 2 in advance without waiting for the activation of the controller unit 5. Further, since the power supply to the controller unit 5 is started when the accessory switch is turned on after the door is opened, the controller unit 5 is not operating at the time when the door open signal is acquired.

By the way, at the time when the door opening signal is acquired, there is a possibility that the video captured by the camera 2 is to be used, but it is undecided whether or not it is actually to be used. Therefore, when the vehicle state signal indicating the state where the video captured by the camera 2 is required is acquired, the vehicular apparatus 1 starts a preparation to display the video captured by the camera 2 on the display 3.

In the present embodiment, a reverse ON signal indicating that the shift position is reverse is set as a vehicle state signal indicating the state where the video captured by the camera 2 is required. Further, the preparation is a process for switching from the state where the welcome message is displayed to the state where the video captured by the camera 2 is displayed, for example.

Specifically, when the ECU 4 detects that the shift position is operated in reverse by the user, the ECU 4 outputs a reverse ON signal to the CAN bus 10. Then, when the communicator unit 8 of the vehicular apparatus 1 acquires the reverse ON signal, it notifies that the reverse ON signal is acquired to the controller unit 5 directly or via the power supply controller unit 9.

It is noted that the operation of turning on the accessory switch is performed by the user before the shift position is changed. When the accessory ON signal is acquired, the initialization of the controller unit 5 is started. Therefore, when the reverse ON signal is output on the CAN bus 10, the controller unit 5 has already started initialization and can receive the notification of the door open signal.

When the reverse ON signal is notified, the user is expected to move the vehicle backward. Then, when the vehicle is moved backward, the video captured by the camera 2 is useful, and the displaying of the video behind is required in the above-mentioned KT Safety Act. That is, the state in which the reverse ON signal is notified can be considered to be a state in which the video captured by the camera 2 is required.

However, depending on the vehicle, the shift position may enter the drive from parking through reverse. Therefore, the vehicular apparatus 1 suspends the determination that the shift position is reverse until the preset waiting period elapses after the reverse ON signal is acquired. Then, if the shift position remains reverse when the waiting period elapses after the reverse ON signal is notified, the vehicular apparatus 1 determines that the shift position is reverse.

Then, when it is determined that the shift position is reverse, the vehicular apparatus 1 starts the process (i.e., the preparation) for displaying the video captured by the camera 2. At this time, in order to display the video captured by the camera 2, it is necessary to perform processing such as switching the drawing data output to the display 3 to the camera 2 side. Therefore, a certain amount of preparation period after the preparation is started is required before the video captured by the camera 2 can be displayed. Then, when this preparation period elapses, the video captured by the camera 2 can be displayed on the display 3.

By the way, since the activation of the camera 2 has been advanced as described above, a video may be input during the preparation period. In this case, after the preparation period is completed, the vehicular apparatus 1 can quickly display the video captured by the camera 2 as shown as the camera view in FIG. 3. That is, the view of the display 3 can be immediately switched from the state in which the welcome view is displayed to the state in which the video captured by the camera 2 is displayed.

As an example, it is assumed that the preparation period managed by the real-time OS of the vehicular apparatus 1 is, for example, 1500 milliseconds at the maximum. Not that depending on the state of the task, the preparation period may be completed shorter than 1500 milliseconds. Further, it is assumed that the activation period of the camera 2 from the start of power supply to the output of video is, for example, 500 milliseconds.

In this case, suppose a known generally-conceivable configuration activating the camera 2 after the preparation of the controller unit 5 is completed. When considering (i) the time required from when the user sets the shift position to the reverse to when the reverse ON signal is output and (ii) the waiting period in the controller unit 5, it becomes difficult for the known configuration to display the video captured by the camera 2 within the time specified by the above-mentioned KT Safety Act.

On the other hand, in the vehicular apparatus 1 of the present embodiment, since the power supply to the camera 2 is started when the door open signal is acquired, the camera 2 can be activated in advance regardless of the operation of the controller unit 5. As a result, as shown in FIG. 3, the activation period of the camera 2 and the waiting period and the preparation period in the controller unit 5 overlap each other. It is thus possible to substantially shorten the time from when the shift position is set to the reverse to when the video captured by the camera 2 is displayed.

Of course, it may be possible to shorten the time until the video captured by the camera 2 is displayed by making the camera 2 capable of starting up at a higher speed or making the controller unit 5 capable of operating at a higher speed. However, in that case, the cost may increase.

Further, the controller unit 5 generally has a processing capacity capable of executing each task supposed in the vehicular apparatus 1. Therefore, if a controller unit capable of higher speed operation is used, excessive performance will occur during normal operation other than activation, which will also lead to an increase in cost.

On the other hand, if the camera 2 is activated in advance as in the present embodiment, it is not necessary for the camera 2 and the controller unit 5 to have excessive performance. That is, it is possible to shorten the time until the video captured by the camera 2 is displayed without causing the controller unit 5 to be excessively speeded up or costly.

Further, in addition to shortening the time until the video captured by the camera 2 is displayed, the vehicular apparatus 1 enables the controller unit 5 to control the displaying operation. This can provide a configuration that is extremely significant from the viewpoint of safety. In other words, in the vehicular apparatus 1, the activation of the camera 2 is moved forward so that the processing result (e.g., the execution result of a task for improving safety) on the controller unit 5 side can be added to the video captured by the camera 2.

Specifically, when the displaying operation of the video captured by the camera 2 is controlled by the controller unit 5, the task of detecting an obstacle when the vehicle moves is executed. As a result, information to be notified to the user can be superimposed and displayed on the video captured by the camera 2, such as showing the obstacle in color or showing the distance to the obstacle numerically. Further, when an obstacle is present in the video captured by the camera 2, it is possible to display a guidance line for avoiding the obstacle. In this case, the detection unit that detects an obstacle, the notification unit that notifies of the obstacle, the guidance unit that displays the guidance line, and the like can be realized by software by a program executed by the controller unit 5.

In this way, the vehicular apparatus 1 starts the power supply to the camera 2 and activates the camera 2 regardless of the operation of the controller unit 5 in a state where the video captured by the camera 2 may be used. At the same time, in the state where the video captured by the camera 2 is required, the controller unit 5 starts a preparation for displaying the video captured by the camera on the display 3 in response to the communicator unit 8 acquiring the vehicle state signal indicating the state where the video captured by the camera 2 is required. This makes it possible to quickly display the video captured by the camera 2. That is, the vehicular apparatus 1 activates the camera 2 and prepares for the displaying operation in advance based on the operation by the user who is expected to use the camera 2.

According to the vehicular apparatus 1 described above, the following effects can be obtained. The vehicular apparatus 1 includes a controller unit 5 that controls a displaying operation of the video captured by the camera 2 on the display 3, and a communicator unit 8 as an acquisition unit that acquires a vehicle state signal indicating the vehicle state. Then, the controller unit 5 starts a preparation for displaying the video captured by the camera 2 on the display 3 based on the acquisition of the vehicle state signal indicating the state where the video captured by the camera 2 is required by the communicator unit 8.

As a result, in a state where the video captured by the camera 2 is required, the controller unit 5 can make a preparation before the video captured by the camera 2 is input. If the video captured by the camera 2 is actually input, the video can be quickly displayed on the display 3. In other words, in a state where the camera is expected to be used, it is possible to prepare for displaying the video captured by the camera in advance in anticipation of the user's operation.

Therefore, in a configuration in which the controller unit 5 of the vehicular apparatus 1 controls the displaying operation of the video captured by the camera 2, the video captured by the camera 2 can be displayed quickly. Further, since the displaying operation of the video captured by the camera 2 is controlled by the controller unit 5, it is possible to add the above-mentioned notification of obstacles to the video captured by the camera 2, and it is possible to improve the safety.

The vehicular apparatus 1 includes a power supply controller unit 9 that supplies power to the camera 2. Then, when the vehicle state signal indicating the state where the video captured by the camera 2 may be used is acquired by the communicator unit 8, the power supply controller unit 9 starts the power supply to the camera 2 regardless of the operation of the controller unit 5.

The controller unit 5 needs to execute various tasks at the time of activation, and it takes a certain amount of time to enter the operating state. Further, the controller unit 5 also needs a certain amount of preparation period for preparation for displaying the video captured by the camera 2. The camera 2 also requires a certain amount of activation period from the start of the power supply to the output of the video. Therefore, if the power supply to the camera 2 is started after waiting until the preparation of the controller unit 5 is completed, the time point at which the video is output from the camera 2 shifts backward. Therefore, there is a risk that quick display will not be possible.

On the other hand, in the vehicular apparatus 1, when the vehicle state signal indicating the state where the video captured by the camera 2 may be used is acquired, the power supply to the camera 2 is started to advance the activation of the camera 2, regardless of the operation of the controller unit 5. As a result, the activation period required to activate the camera 2 and the preparation period of the controller unit 5 can be overlapped, and the period until the video captured by the camera 2 is output can be substantially shortened.

The vehicular apparatus 1 sets a reverse ON signal indicating that the shift position is reverse as a vehicle state signal indicating the state where the video captured by the camera 2 is required. When the reverse ON signal is input, the user is considered to move the vehicle backward. Then, when the vehicle is moved backward, the video captured by the camera 2 can be effectively used, and it is considered necessary according to the above-mentioned KT Safety Act. That is, the reverse ON signal is a signal that can be determined to be in a state where the video captured by the camera 2 is required.

Therefore, in a configuration in which the controller unit 5 of the vehicular apparatus 1 controls the displaying operation of the video captured by the camera 2, the video captured by the camera 2 can be displayed quickly by the controller unit 5 starting the preparation for displaying the video captured by the camera 2 on the display 3 in response to acquiring the reverse ON signal.

Further, the vehicular apparatus 1 sets a door open signal indicating that the door is open as a vehicle state signal indicating the state where the video captured by the camera 2 may be used. If the door is opened, it is possible that the user may get into the vehicle and move the vehicle. When moving the vehicle, the video captured by the camera 2 can be effectively used, and when moving the vehicle backward, it is considered necessary according to the above-mentioned KT Safety Act. That is, the door open signal is a signal that can be determined to be in a state where the video captured by the camera 2 may be used.

Therefore, by starting the power supply to the camera 2 when the door open signal is acquired, the activation of the camera 2 can be advanced. In a configuration in which the controller unit 5 of the vehicular apparatus 1 controls the displaying operation of the video captured by the camera 2, the video captured by the camera 2 can be displayed quickly.

In the present embodiment, an example is described in which the video captured by the camera 2 is input before the preparation of the controller unit 5 is completed, but it is assumed that the video captured by the camera 2 has not been input yet when the preparation of the controller unit 5 is completed. Therefore, if the video captured by the camera 2 is not input at the time when the preparation for displaying the video captured by the camera 2 on the display 3 is completed, the controller unit 5 can wait for switching to the video captured by the camera 2 at the earliest until the video captured by the camera 2 is actually input. As a result, it is possible to prevent the displayed view from becoming complete black or a screen such as noise being displayed because the video captured by the camera 2 is not input.

In the present embodiment, a door opening signal indicating that the door of the vehicle is opened has been exemplified as a vehicle state signal indicating the state where the video captured by the camera 2 may be used. However, there is no need to be limited thereto. For example, the vehicle state signal indicating the state where the video captured by the camera 2 may be used may be set to be an unlock signal indicating that the door of the vehicle is unlocked, an IG ON signal indicating that the ignition switch is turned on, or an accessory ON signal indicating that the accessory switch is turned on.

Second Embodiment

Figure 4:
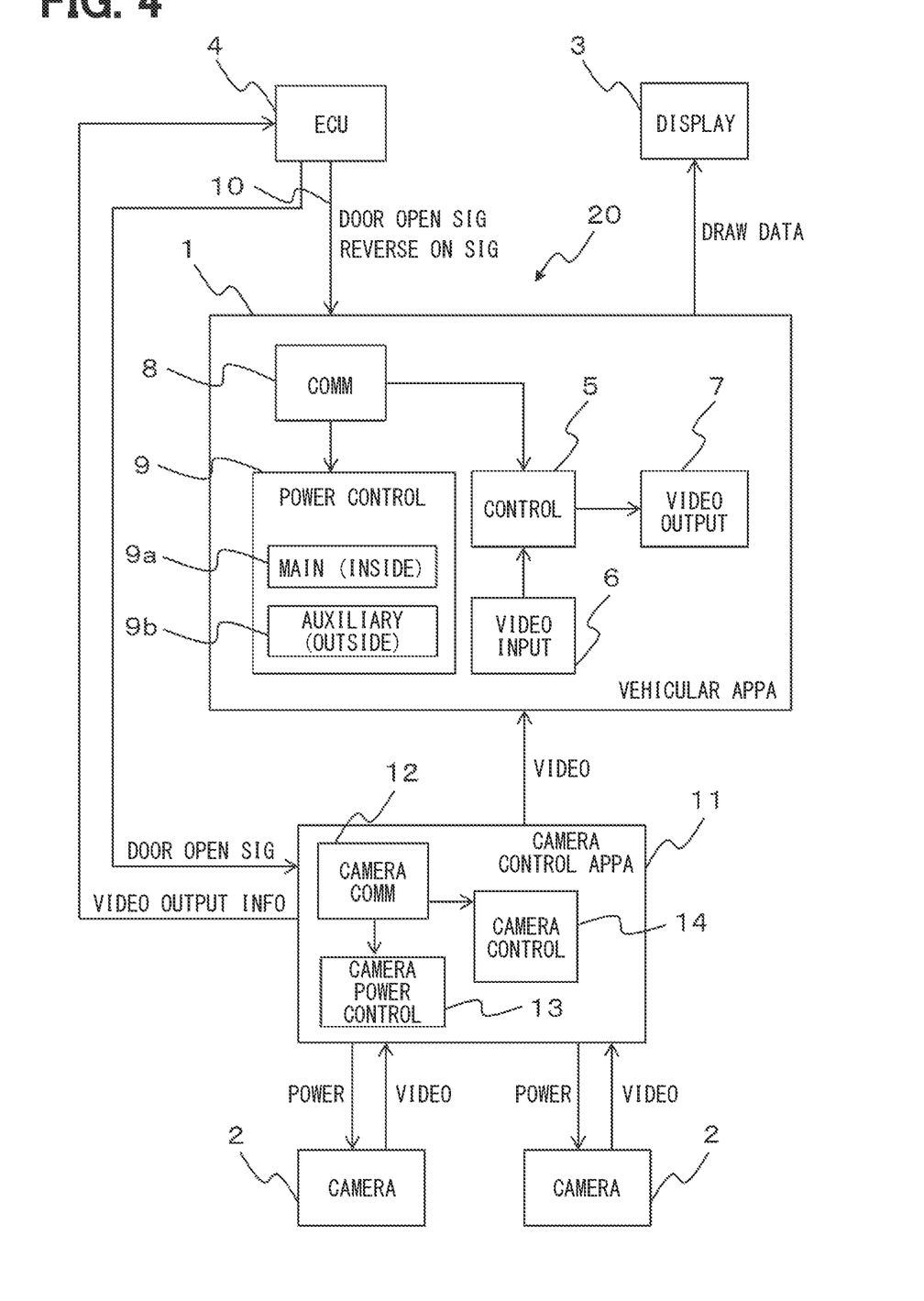
FIG. 4 is a diagram schematically showing an electrical configuration of a vehicular apparatus according to a second embodiment.

The following will describe a second embodiment. In the second embodiment, the connection with the camera 2 and the displaying sequence of the video captured by the camera 2 are different from those of the first embodiment. Since the electrical configuration of the vehicular apparatus 1 is basically the same as that of the first embodiment, the same reference numerals will be given for description.

Hereinafter, the second embodiment will be described. As shown in FIG. 4, the vehicular apparatus 1 mounted on the vehicle is connected to a camera control apparatus 11, the display 3, the ECU 4, and the like. Note that FIG. 4 illustrates a configuration in which one display 3 and one ECU 4 are connected to the vehicular apparatus 1. However, the vehicular apparatus 1 may be configured to be connected to a plurality of displays 3 and/or a plurality of ECUs 4. The vehicular apparatus 1 is included in a vehicular system 20 that includes the vehicular apparatus 1 and a camera control apparatus 11. In the vehicular system 20, the vehicular apparatus 1 and the camera control apparatus 11 cooperate with each other to display a video captured by the camera 2 on the display 3.

The vehicular apparatus 1 includes the controller unit 5, the video input unit 6, the video output unit 7, the communicator unit 8, and the power supply controller unit 9, as in the first embodiment. The controller unit 5 includes a so-called microcomputer, and controls the entire vehicular apparatus 1 by executing a computer program stored in a storage or a storage medium (not shown). As shown in FIG. 2, on the controller unit 5, for example, a plurality of OSs are executed, and various tasks for controlling the vehicular apparatus 1 operate in a state in which the execution time and the like are managed.

Further, the controller unit 5 controls a displaying operation of a video captured by the camera 2 on the display 3. Thus, the controller unit 5 may be also referred to as a display controller unit 5 or a display controller 5, as described in the first embodiment. The "controller" will be described in detail to be later. Specifically, the controller unit 5 processes the video captured by the camera 2 input to the video input unit 6 configured by an AD converter or the like. The controller unit 5 then performs a control of outputting the processed video, for example, as LVDS format drawing data to a display, from the video output unit 7 configured by an LVDS driver or the like. In the present embodiment, the video captured by the camera 2 is input to the vehicular apparatus 1 via the camera control apparatus 11, but is input in the NTSC format as in the first embodiment.

The communication unit 8 is always in the activated state and monitors the vehicle state signal output from the ECU 4. When the communicator unit 8 receives the vehicle state signal to be responded to or dealt with, the communicator unit 8 activates the power supply controller unit 9. In the present embodiment, the vehicle state signal to be dealt with includes a door open signal as a vehicle state signal indicating the state where that the video captured by the camera 2 may be used; and a reverse ON signal as a vehicle state signal indicating the state where the video captured by the camera 2 is required. The communicator unit 8 corresponds to an acquisition unit that acquires a vehicle state signal indicating the state of the vehicle, as in the first embodiment. As described in the first embodiment, the communicator unit 8 may also be referred to as a communicator 8 or a transceiver 8. Yet further, the communicator unit 8 may be realized as a controller, which may be referred to as a communication controller 8. The "controller" will be described in detail to be later.

The power supply controller unit 9 includes the main power supply circuit 9a and the auxiliary power supply circuit 9b. As described in the first embodiment, the power supply controller unit 9 may also be referred to as a power supply controller 9. The "controller" will be described in detail to be later. The main power supply circuit 9a supplies power to devices provided inside the vehicular apparatus 1, such as the controller unit 5. The auxiliary power supply circuit 9b supplies power to devices that are not supplied with power from the main power supply circuit 9a. Further, the auxiliary power supply circuit 9b can also supply power to devices provided outside the vehicular apparatus 1, and supplies power independently of the main power supply circuit 9a, for example, for a communication interface with an external device.

The power supply controller unit 9 controls, for example, a state in which only the auxiliary power supply circuit 9b is operated or a state in which the main power supply circuit 9a and the auxiliary power supply circuit 9b are operated according to the state of the vehicle. Further, the power supply controller unit 9 starts the power supply to the controller unit 5 when the communicator unit 8 as the acquisition unit acquires a vehicle state signal indicating the state where the video captured by the camera 2 may be used.

One or more cameras 2 are connected to the camera control apparatus 11. Of these, one camera 2 is provided for rearward monitoring or reward confirmation to capture an image or video of the rear of the vehicle. Further, another camera 2 is provided for capturing an image or video of, for example, the front or side of the vehicle. These cameras 2 each output a video in NTSC format when the power supply is started and the internal initialization is completed. In other words, the cameras 2 each take a certain amount of time from the start of the power supply to the output of the video. It should be noted that the configuration may be such that three or more cameras 2 are provided.

The camera control apparatus 11 includes a camera-side communicator unit 12 as a camera-side acquisition unit that acquires a vehicle state signal indicating the vehicle state, a camera-side power supply controller unit 13 that supplies power to the camera 2, and a camera-side controller unit 14 that outputs the video captured by the camera 2 and the video output information indicating that the video can be output to the CAN bus 10.

Like the communicator unit 8 of the vehicular apparatus 1, the camera-side communicator unit 12 is always in the activated state and monitors the vehicle state signal flowing through the CAN bus 10. Then, when the camera-side communicator unit 12 receives the corresponding vehicle state signal, the camera-side communicator unit 12 activates the power supply controller unit 9. Further, the camera-side communicator unit 12 may also be referred to as a camera-side communicator 12 or a camera-side transceiver 12. Yet further, the camera-side communicator unit 12 may be realized as a controller, which may be referred to as a camera-side communication controller 12. The "controller" will be described in detail to be later. In the present embodiment, the vehicle state signal to be dealt with includes (i) an IG ON signal as a vehicle state signal indicating the state where the video captured by the camera 2 may be used and (ii) a reverse ON signal as a vehicle state signal indicating the state where the video by the camera 2 is required. An accessory ON signal can also be used instead of the IG ON signal.

The camera-side power supply controller unit 13 supplies power to the camera 2 and the camera-side controller unit 14. Further, the camera-side power supply controller unit 13 may also be referred to as a camera-side power supply controller 13. The "controller" will be described in detail to be later. In the present embodiment, when the camera-side communicator unit 12 notifies that the camera-side power supply controller unit 13 has acquired the IG ON signal, the camera-side power supply controller unit 13 starts the power supply to the camera 2 and the camera-side controller unit 14.

The camera-side controller unit 14 includes a so-called microprocessor, and controls the entire camera control apparatus 11. Further, the camera-side controller unit 14 controls outputting of a video by the camera 2 selected from a plurality of cameras 2 and outputting of video output information indicating that a video by the camera 2 can be output. Note that the camera-side controller unit 14 may also be referred to as a camera-side controller 14. Further, as described above, the camera-side controller unit 14 controls outputting of the video and video output information so that the camera-side controller unit 14 may also be referred to as a camera-side output controller unit 14 or a camera-side output controller 14. The "controller" will be described in detail to be later.

Similar to the first embodiment, the ECU 4 outputs a vehicle state signal indicating the vehicle state to the vehicular apparatus 1 and the camera control apparatus 11 via the CAN bus 10. The ECU 4 outputs, for example, a vehicle state signal indicating that the door is opened, a vehicle state signal indicating that the door is unlocked, a vehicle state signal indicating the position of the shift lever, or the like. The ECU 4 can also output other vehicle state signals required for the vehicle.

Next, the operation of the above configuration will be described.

As described in the first embodiment, if the controller unit 5 and the camera 2 of the vehicular apparatus 1 are improved in performance in order to quickly display the video captured by the camera 2, there is a problem that the cost is increased and excessive performance occurs. In this case, suppose a known generally-conceivable configuration activating the camera 2 after the preparation of the controller unit 5 is completed. When considering (i) the time required from when the user sets the shift position to the reverse to when the reverse ON signal is output and (ii) the waiting period in the controller unit 5, it becomes difficult for the known configuration to display the video captured by the camera 2 within the time specified by the above-mentioned KT Safety Act.

Therefore, in the present embodiment, in the configuration in which the controller unit 5 controls the displaying operation of the video captured by the camera 2 as follows, the video captured by the camera 2 can be quickly displayed at the time of activation.

Figure 5:
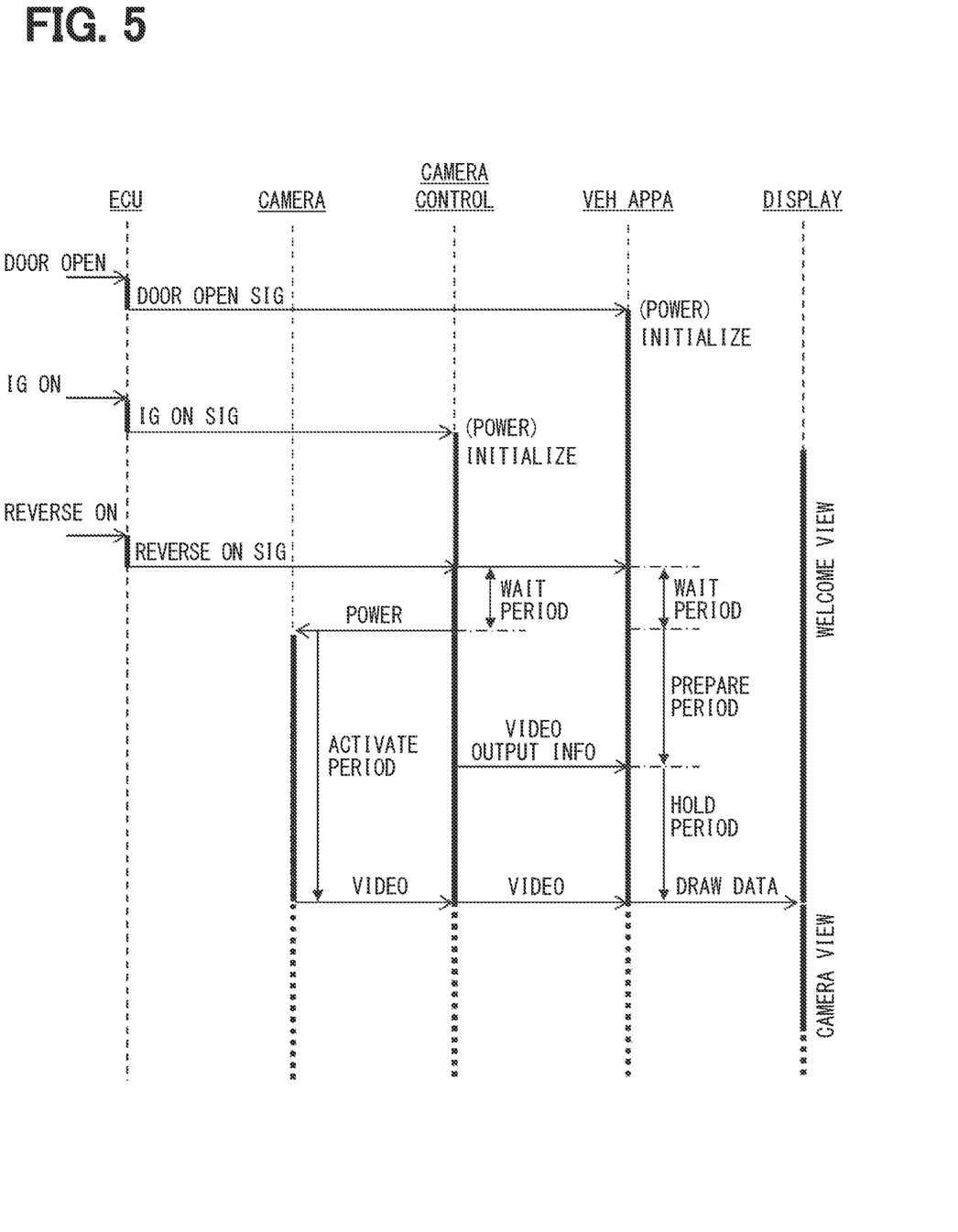
FIG. 5 is a diagram illustrating a displaying sequence by the vehicular apparatus according to the second embodiment.

Specifically, the power supply to the vehicular apparatus 1 and the camera 2 is turned off before the vehicle is started. Then, as shown in FIG. 5, when the user performs an operation to open the door, the ECU 4 detects the opening of the door and outputs a door opening signal to the CAN bus 10. When the communicator unit 8 of the vehicular apparatus 1 acquires the door open signal, the communicator unit 8 notifies the power supply controller unit 9 that the door open signal is acquired. Then, the power supply controller unit 9 that has received the notification starts the power supply to the controller unit 5 because there is a possibility of using the video captured by the camera 2.

When the power supply is started, the controller unit 5 starts initialization. In this initialization process, the hypervisor 5b is activated, the OS 5c is activated, the peripheral devices such as the video input unit 6 and the video output unit 7 are initialized, the camera application 5f is activated, and a welcome message, which is shown as a welcome view in FIG. 5, is displayed on the meter display 17. It should be noted that the power supply to the controller unit 5 may be started when the IG ON signal or the accessory ON signal described below is acquired.

Subsequently, when the user performs an operation in which the IG switch is turned on, the ECU 4 detects that the IG switch is turned on and outputs an IG ON signal to the CAN bus 10. This IG ON signal is set in the camera control apparatus 11 as a vehicle state signal indicating the state where the video captured by the camera 2 may be used. Therefore, when the camera-side power supply controller unit 13 is notified that the IG ON signal is acquired, the camera-side power supply controller unit 13 starts the power supply to the camera-side controller unit 14. Then, the camera-side controller unit 14 starts initialization.

At this point, it is undecided whether to actually use the camera 2. Therefore, the controller unit 5 of the vehicular apparatus 1 and the camera-side controller unit 14 of the camera control apparatus 11 are waiting while being initialized. Then, when the shift position is operated in reverse by the user, the operation is detected by the ECU 4, and the reverse ON signal is output to the CAN bus 10.

When the reverse ON signal is acquired, the vehicular apparatus 1 suspends the determination that the shift position is reverse until the preset waiting period elapses. Similarly, the camera control apparatus 11 also suspends the determination that the shift position is reverse until the preset waiting period elapses. This is to confirm that the shift position is reverse, as described in the first embodiment.

Then, if the shift position remains reverse when the waiting period elapses after the reverse ON signal is notified, the camera control apparatus 11 determines that the shift position is reverse. Then, since the reverse ON signal is set as a vehicle state signal indicating the state where the video captured by the camera 2 is required, the camera control apparatus 11 starts the power supply to the camera 2 when it is determined that the shift position is reverse. In other words, the camera control apparatus 11 independently activates the camera 2 without waiting for an instruction from the vehicular apparatus 1, regardless of the operation of the camera-side controller unit 14.

At this time, when the power supply is started, the camera 2 outputs a video after the internal initialization is completed. The activation period required from the start of the power supply to the output of the video is assumed to take, for example, about 500 milliseconds in the present embodiment, although it depends on the specifications of the camera 2. Therefore, in a state where the video captured by the camera 2 may be used, the camera control apparatus 11 starts the power supply to the camera 2 regardless of the operation of the camera-side controller unit 14.

As a result, the time point at which the video is output can be accelerated as compared with the case where the power supply to the camera 2 is started after the camera-side controller unit 14 is activated. That is, when the operation of the user who is expected to use the camera 2 is confirmed, the camera control apparatus 11 activates the camera 2 in advance without waiting for the activation of the camera-side controller unit 14.

Then, when the camera 2 is activated, the camera control apparatus 11 outputs video output information indicating that the video captured by the camera 2 can be output without waiting for the output of the actual video from the camera 2. That is, when the camera control apparatus 11 determines that the video captured by the camera 2 is required even if there is no instruction from the vehicular apparatus 1, the camera control apparatus 11 outputs the video output information to the vehicular apparatus 1 in advance. Note that FIG. 5 shows as if the video output information is directly output from the camera control apparatus 11 to the vehicular apparatus 1 for simplification of the description. However, the actual video output information is output to the vehicular apparatus 1 via the CAN bus 10 as shown in FIG. 4.

In contrast, if the shift position remains reverse when the waiting period elapses after the reverse ON signal is notified, the vehicular apparatus 1 determines that the shift position is reverse. The reverse ON signal is set as a vehicle state signal indicating the state where the video captured by the camera 2 is required. When it is determined that the shift position is reverse, the vehicular apparatus 1 thus starts the preparation for displaying the video captured by the camera 2 without waiting for the input of the video output information and without waiting for the input of the actual video captured by the camera 2.

That is, when the vehicular apparatus 1 determines that the video captured by the camera 2 is required, the vehicular apparatus 1 executes the preparation for displaying the video captured by the camera 2 in advance even if the video output information is not input. This is because if the shift position is in the reverse, the vehicle is expected to move backward, and in that case, the video captured by the camera 2 for checking the rear is required.

The vehicular apparatus 1 that has started the preparation waits until the video output information is input, here, until it is acquired by the communicator unit 8. Then, the vehicular apparatus 1 determines that the displaying operation on the display 3 is possible when the video output information is actually input. However, as described above, the video output information is output earlier than the actual video output. Therefore, even if the video output information is input, there is a possibility that the video captured by the camera 2 is not yet input.

Suppose a case where the video captured by the camera 2 is not input to the vehicular apparatus 1 when the preparation for displaying the video captured by the camera 2 on the display 3 is completed. In such a case, the vehicular apparatus 1 waits for switching to the video captured by the camera 2 at the earliest until the video captured by the camera 2 is actually input. Specifically, the vehicular apparatus 1 sets a holding period, and refrains from switching to the video captured by the camera 2 during the holding period. In this holding period, the display 3 may be muted, but the welcome message or the like displayed when the vehicular apparatus 1 is activated may be continuously displayed as it is.

By providing this holding period, it is possible to prevent the screen from becoming complete black or displaying a video such as noise. Then, when the holding period elapses, that is, when the video captured by the camera 2 is input, the vehicular apparatus 1 switches to the video captured by the camera 2 and displays it on the display 3.

In this way, the vehicular apparatus 1 accelerates the activation of the camera 2 on the camera control apparatus 11 side. As a result, even when the video captured by the camera 2 is input via the camera control apparatus 11, which is a device that requires initialization or preparation, the vehicular apparatus 1 can quickly display the video captured by the camera 2.

In this case, suppose a known generally-conceivable configuration activating the camera 2 after the preparation of the camera-side controller unit 14 is completed. When considering (i) the time required from when the user sets the shift position to the reverse to when the reverse ON signal is output, (ii) the time required for initializing the camera 2 itself, and (iii) the time required for activating the camera control apparatus 11, and the like, it becomes difficult to display the video captured by the camera 2 within the time specified by the above-mentioned KT Safety Act.

On the other hand, in the vehicular apparatus 1 of the present embodiment, the video output information is output from the camera control apparatus 11 in advance, and the preparation is made in advance based on the reverse ON signal indicating the state where the video captured by the camera 2 is required. As a result, as shown in FIG. 5, the activation period of the camera 2, the activation time of the camera control apparatus 11, and the activation time of the vehicular apparatus 1 can be overlapped. It is thus possible to substantially shorten the time from when the shift position is set to be reverse to when the video captured by the camera 2 is displayed.

In this case, what the camera control apparatus 11 performs is (i) to start the power supply to the camera 2 when the video captured by the camera 2 is needed, and (ii) to output the video output information in advance. Therefore, the processing load of the camera-side controller unit 14 is small, and there is little need to improve the performance. Therefore, it is not necessary to have a useless processing capacity that is not used except at the time of activation, and the cost increase can be suppressed.

Further, in the vehicular apparatus 1, in addition to shortening the time until the video captured by the camera 2 is displayed, the controller unit 5 can control the displaying operation. The vehicular apparatus 1 is thus provided with the configuration which is extremely significant from the viewpoint of safety. In other words, the vehicular apparatus 1 accelerates the activation of the camera 2, thereby adding the processing result on the controller unit 5 (e.g., the execution result of a task for improving safety) to the video captured by the camera 2.

Specifically, the displaying operation of the video captured by the camera 2 is controlled by the controller unit 5. In this configuration, when executing the task of detecting an obstacle when the vehicle moves, the obstacle can be colored and shown, or the distance to the obstacle can be shown numerically. In such a manner, information to be notified to the user can be superimposed and displayed on the video captured by the camera 2. Further, when an obstacle is present in the video captured by the camera 2, it is possible to display a guidance line for avoiding the obstacle. In this case, the detection unit that detects an obstacle, the notification unit that notifies of the obstacle, the guidance unit that displays the guidance line, and the like can be realized by software by a program executed by the controller unit 5.

As described above, in a state where the video captured by the camera 2 may be used, the vehicular apparatus 1 starts a preparation for displaying the video on the display 3 without waiting for the input of the video output information or the video from the camera 2. This makes it possible to quickly display the video captured by the camera 2. That is, the vehicular apparatus 1 activates the camera 2 and prepares for the displaying operation in advance based on the operation of the user who is expected to use the camera 2.

According to the vehicular apparatus 1 according to the second embodiment described above, the following effects can be obtained. The vehicular apparatus 1 includes a controller unit 5 that controls the displaying operation of the video captured by the camera 2 input via the camera control apparatus 11 on the display 3, a communicator unit 8 as an acquisition unit that acquires a vehicle state signal indicating a vehicle state, and a power supply controller unit 9 that supplies power to the controller unit 5.

The camera control apparatus 11 includes a camera-side controller unit 14 that controls outputting of the video by the camera 2 and outputting of the video output information indicating that the video captured by the camera 2 can be output, and a camera-side communicator unit 12 as a camera-side acquisition unit that acquires a vehicle state signal indicating a vehicle state.

Then, when the camera-side communicator unit 12 acquires the vehicle state signal indicating the state where the video captured by the camera 2 may be used, the camera control apparatus 11 starts the initialization of the camera-side controller unit 14. In addition, when the camera-side communicator unit 12 acquires the vehicle state signal indicating the state where the video captured by the camera 2 is required, the camera control apparatus 11 outputs the video output information without waiting for the output of the actual video from the camera 2.

At this time, when the vehicle state signal indicating the state where the video captured by the camera 2 may be used is acquired by the communicator unit 8, the power supply controller unit 9 of the vehicular apparatus 1 starts the power supply to the controller unit 5. As a result, the activation of the controller unit 5 can be completed earlier than the usual (i.e., the IG switch being turned on). Then, the controller unit 5 of the vehicular apparatus 1 starts the displaying operation of the video captured by the camera 2 on the display 3 based on the acquisition of the vehicle state signal indicating the state where the video captured by the camera 2 is required by the communicator unit 8. In the present embodiment, the controller unit 5 starts the preparation for displaying the video captured by the camera 2 on the display 3 without waiting for the input of the video output information.

As a result, in a state where the video captured by the camera 2 is required, the preparation can be started on the vehicular apparatus 1 side before the video captured by the camera 2 is input. If the video captured by the camera 2 is input, the video can be quickly displayed on the display 3. In other words, in a state where the camera is expected to be used, it is possible to prepare for displaying the video captured by the camera in advance in anticipation of the operation by the user.

Therefore, in a configuration in which the controller unit 5 of the vehicular apparatus 1 controls the displaying operation of the video captured by the camera 2, the video captured by the camera 2 can be displayed quickly. Further, since the displaying operation of the video captured by the camera 2 is controlled by the controller unit 5, it is possible to add the above-mentioned notification of obstacles to the video captured by the camera 2, and it is possible to improve the safety.

When the vehicle state signal indicating the state where the video captured by the camera 2 is required is acquired by the camera-side communicator unit 12, the camera control apparatus 11 starts the power supply to the camera 2 regardless of the operation of the camera-side controller unit 14 and without waiting for the instruction from the vehicular apparatus 1. As a result, the activation period required to activate the camera 2 and the activation time of the camera-side controller unit 14 can be overlapped. The period until the video captured by the camera 2 is output can be substantially shortened.

The vehicular apparatus 1 sets a reverse ON signal indicating that the shift position is reverse as a vehicle state signal indicating the state where the video captured by the camera 2 is required. When the reverse ON signal is input, the user is considered to move the vehicle backward. Then, when the vehicle is moved backward, the video captured by the camera 2 can be effectively used, and it is considered necessary according to the above-mentioned KT Safety Act. That is, the reverse ON signal is a signal that can be determined to be in a state where the video captured by the camera 2 is required.

Therefore, in a configuration in which the controller unit 5 of the vehicular apparatus 1 controls the displaying operation of the video captured by the camera 2, the video captured by the camera 2 can be displayed quickly by the controller unit 5 starting the preparation for displaying the video captured by the camera 2 on the display 3 in response to acquiring the reverse ON signal.

Further, the vehicular apparatus 1 sets a door open signal indicating that the door is open as a vehicle state signal indicating the state where the video captured by the camera 2 may be used. If the door is opened, it is possible that the user may get into the vehicle and move the vehicle. Then, when moving the vehicle, the video captured by the camera 2 can be effectively used, and when moving the vehicle backward, it is considered necessary according to the above-mentioned KT Safety Act. That is, the door open signal is a signal that can be determined to be in a state where the video captured by the camera 2 may be used.

Therefore, in a configuration in which the controller unit 5 of the vehicular apparatus 1 controls the displaying operation of the video captured by the camera 2, by starting the preparation for displaying the video captured by the camera 2 when the door open signal is acquired, the video captured by the camera 2 can be quickly displayed.

Further, as in the present embodiment, the vehicular system 20 is provided to include the vehicular apparatus 1 and the camera control apparatus 11. In the vehicular system 20, the vehicular apparatus 1 and the camera control apparatus 11 cooperate to display the video captured by the camera 2 on the display 3. Also, by the vehicular system 20, the same effect as that of the vehicular apparatus 1 can be obtained, such as being able to quickly display the video captured by the camera 2.

In the present embodiment, an IG ON signal indicating that the ignition switch is turned on is exemplified as a vehicle state signal indicating the state where the video captured by the camera 2 may be used. There is however no need to be limited thereto. For example, a door open signal indicating that the vehicle door is opened, an unlock signal indicating that the vehicle door is unlocked, or an accessory ON signal indicating that the accessory switch is turned on may be set as a vehicle state signal indicating the state where the video captured by the camera 2 may be used.

In each embodiment, the vehicle state signal is acquired via the ECU 4. However, the vehicular apparatus 1 itself may be enabled to detect the vehicle state. If the vehicular apparatus 1 itself can detect the vehicle state, based on the state of the vehicle detected by vehicular apparatus 1 itself, the video captured by the camera 2 can be displayed quickly by accelerating the activation of the camera 2 and starting the preparation without waiting for the actual video input, as in each embodiment.

While the present disclosure has been described in accordance with the embodiment, it is understood that the present disclosure is not limited to such embodiments or structures. The present disclosure also includes various modifications and modifications within an equivalent range. In addition, various combinations and forms, and further, other combinations and forms including only one element, or more or less than these elements are also within the sprit and the scope of the present disclosure.

As described in the above embodiments, each of the controller unit 5, the communication controller 8 as the communicator unit 8, the power supply controller unit 9, the camera-side controller unit 14, the camera-side communication controller 12 as the camera-side communicator unit 12, and the camera-side power supply controller unit 13 may be configured as a controller. Such a controller and method described in the present disclosure in the above embodiments may be implemented by one or more than one special-purpose computer. Such a special-purpose computer may be created (i) by configuring (a) a memory and a processor programmed to execute one or more particular functions embodied in computer programs, or (ii) by configuring (b) a processor provided by one or more special-purpose hardware logic circuits, or (iii) by configuring a combination of (a) a memory and a processor programmed to execute one or more particular functions embodied in computer programs and (b) a processor provided by one or more special-purpose hardware logic circuits. The computer programs may be stored, as instructions to be executed by a computer, in a tangible non-transitory computer-readable storage medium.

For reference to further explain features of the present disclosure, the description is added as follows.

There is a vehicular apparatus which displays a video captured by an in-vehicle camera on a display in the vehicle. It takes time for a controller of the vehicular apparatus to be activated. Therefore, it has been proposed that the controller of the vehicular apparatus is bypassed at the time of activation, and another controller on the display side performs a process of displaying a video.

However, it is considered that the controller of the vehicular apparatus can quickly display the video captured by the camera as needed except at the time of activation. In other words, if the video captured by the camera can be displayed quickly when the vehicular apparatus is activated, it is considered unnecessary to improve the performance of the controller or use a device other than the controller.

It is thus desired to provide a vehicular apparatus capable of quickly displaying a video by a camera in a configuration in which a controller unit of the vehicular apparatus controls a displaying operation of the video by the camera.

An aspect of the present disclosure described herein is set forth in the following clauses.

According to an aspect of the present disclosure, a vehicular apparatus is provided to include a controller unit and an acquisition unit. The controller unit is configured to control a displaying operation of a video by a camera on a display. The n acquisition unit is configured to acquire a vehicle state signal indicating a vehicle state. Herein, the controller unit is further configured to start a preparation for displaying the video by the camera on the display in response to the acquisition unit acquiring the vehicle state signal indicating the vehicle state where the video by the camera is required.

With such a configuration, it is possible to activate the camera in advance in a vehicle state where the camera may be used. At the same time, preparations for displaying camera videos can be made in advance. Therefore, in a configuration in which the controller unit of the vehicular apparatus controls the displaying operation of the video by the camera, the video by the camera can be displayed quickly.

What is claimed is:

1. A vehicular apparatus comprising:
   a controller unit having a processor and memory configured to control a displaying operation of a video by a camera on a display, the video by the camera being input via a camera control apparatus;
   an acquisition unit having a processor and memory configured to acquire a vehicle state signal indicating a vehicle state; and
   a power supply controller unit having a processor and memory configured to perform a power supply to the controller unit,
   wherein:
   the camera control apparatus includes
   a camera-side controller unit having a processor and memory configured to output the video by the camera and output video output information indicating that the video by the camera is enabled to be output, and
   a camera-side acquisition unit having a processor and memory configured to acquire the vehicle state signal indicating the vehicle state;
   in response to the camera-side acquisition unit acquiring the vehicle state signal indicating the vehicle state where there is a possibility for the video by the camera to be used, the camera control apparatus is configured to start an initialization of the camera-side controller unit; and
   in response to the camera-side acquisition unit acquiring the vehicle state signal indicating the vehicle state where the video by the camera is required, the camera control apparatus is configured to output video output information without awaiting an actual output of the video by the camera from the camera,
   wherein:
   in response to the acquisition unit acquiring the vehicle state signal indicating the vehicle state where there is a possibility for the video by the camera to be used, the power supply controller unit is configured to start the power supply to the controller unit;
   in response to the acquisition unit acquiring the vehicle state signal indicating the state where the video by the camera is required, the controller unit is configured to start a preparation for displaying the video by the camera on the display without waiting for an input of the video output information; and
   in response to the camera-side acquisition unit acquiring the vehicle state signal indicating the vehicle state where the video by the camera is required, the camera control apparatus is configured to start a power supply to the camera regardless of an operation of the camera-side controller unit.

2. The vehicular apparatus according to claim 1, wherein:
   the vehicle state signal indicating the vehicle state where the video by the camera is required indicates a shift position being reverse.

3. The vehicular apparatus according to claim 1, wherein:
   the vehicle state signal indicating the vehicle state where the video by the camera may be used indicates a door being opened, a door being unlocked, an ignition switch being turned on, or an accessory switch being turned on.

4. The vehicular apparatus according to claim 1, wherein:
   in response to not receiving the video by the camera at a time when the preparation for displaying the video by the camera on the display is completed, the controller unit is configured to await switching to the video by the camera at earliest until the video by the camera is actually input.

5. A vehicular apparatus, comprising
   a display controller configured to control a displaying operation of a video by a camera on a display, the video by the camera being input via a camera control apparatus;
   a communication controller configured to acquire a vehicle state signal indicating a vehicle state; and
   a power supply controller configured to perform a power supply to the display controller,
   wherein:
   the camera control apparatus includes
   a camera-side output controller configured to output the video by the camera and output video output information indicating that the video by the camera is enabled to be output, and
   a camera-side communication controller configured to acquire the vehicle state signal indicating the vehicle state;
   in response to the camera-side communication controller acquiring the vehicle state signal indicating the vehicle state where there is a possibility for the video by the camera to be used, the camera control apparatus is configured to start an initialization of the camera-side output controller; and
   in response to the camera-side communication controller acquiring the vehicle state signal indicating the vehicle state where the video by the camera is required, the camera control apparatus is configured to output video output information without awaiting an actual output of the video by the camera from the camera,
   wherein:
   in response to the communication controller acquiring the vehicle state signal indicating the vehicle state where there is a possibility for the video by the camera to be used, the power supply controller is configured to start the power supply to the display controller; and
   in response to the communication controller acquiring the vehicle state signal indicating the state where the video by the camera is required, the display controller is configured to start a preparation for displaying the video by the camera on the display without waiting for an input of the video output information;
   in response to the camera-side communication controller acquiring the vehicle state signal indicating the vehicle state where the video by the camera is required, the camera control apparatus is configured to start a power supply to the camera regardless of an operation of the camera-side output controller.

\* \* \* \* \*